United States Patent [19]
Smagatz

[11] Patent Number: 4,572,522
[45] Date of Patent: Feb. 25, 1986

[54] INTERLOCKING SECTIONAL GASKET ASSEMBLY AND METHOD OF MAKING SAME

[75] Inventor: Leonard J. Smagatz, Riverwoods, Ill.

[73] Assignee: Felt Products Mfg. Co., Skokie, Ill.

[21] Appl. No.: 730,585

[22] Filed: May 6, 1985

[51] Int. Cl.[4] .................. F16J 15/12; B65D 53/00
[52] U.S. Cl. .................... 277/199; 277/166; 277/235 B
[58] Field of Search .............. 277/166, 1, 192–194, 277/199, 235 B, 180, 228

[56] References Cited

U.S. PATENT DOCUMENTS

| | | |
|---|---|---|
| 1,752,848 | 4/1930 | Howard . |
| 1,986,465 | 1/1935 | Dempsey ................... 277/199 |
| 2,768,036 | 10/1956 | Greenough ................ 277/199 |
| 2,834,440 | 5/1958 | Berg .......................... 277/180 |
| 2,851,317 | 9/1958 | Griefenstein .............. 277/199 X |
| 3,063,439 | 11/1962 | Kessel ....................... 277/166 X |
| 3,175,832 | 3/1965 | Carrell ...................... 277/199 |
| 3,231,289 | 1/1966 | Carrell ...................... 277/199 X |
| 3,717,351 | 2/1973 | Liebig ....................... 277/199 X |
| 3,738,670 | 7/1973 | Jelinek ...................... 277/199 |
| 4,293,135 | 10/1981 | Wallace .................... 277/199 X |
| 4,429,921 | 2/1984 | Fritz et al. ................ 277/166 X |

FOREIGN PATENT DOCUMENTS 982259 2/1965 United Kingdom ............... 277/166

*Primary Examiner*—Robert S. Ward
*Attorney, Agent, or Firm*—Dressler, Goldsmith, Shore, Sutker & Milnamow, Ltd.

[57] ABSTRACT

A sectional gasket assembly and method of making same from at least two elongated gasket sections. Each gasket section has a first connecting element at one end and a second connecting element at the second end. The first end has a first button and a first opening of a given configuration and serving as the first connecting element. The second end has a second button and a second opening of the same configuration serving as the second connecting element. The first end is adapted to be juxtaposed and sealingly mated with an end of a second elongated gasket section to provide a sealed joint thereat. Each juxtaposed opening and button is press-fit to enhance the seal. When the buttons and openings at each end of the gasket section are formed on the same surface of the gasket section, pairs of first openings and buttons may be juxtaposed in complementary fashion, and when the gasket sections are curved or L-shaped, plural pairs of joined gasket sections may be assembled to form an annular gasket assembly.

30 Claims, 6 Drawing Figures

4,572,522

INTERLOCKING SECTIONAL GASKET ASSEMBLY AND METHOD OF MAKING SAME

This invention relates to an improved interlocking sectional gasket assembly, and, in particular, to one which is made of a number of gasket sections which, when assembled, form a finished gasket assembly of selected size and shape.

BACKGROUND OF THE INVENTION

The manufacture of unitary gaskets of large size can be expensive, particularly when such gaskets are of a molded elastomeric material and a large mold and press is required to make such. As one approach to avoiding this disadvantage, gaskets have been made in sections which may be joined together to provide a variety of sizes and outline shapes. Sectional gasket assemblies of this general type are shown, for example, in U.S. Pat. Nos. 1,986,465, 3,231,289, 3,175,832, 3,738,670, and 4,293,135.

In prior art sectional gaskets, interlocking joints between the sections have been provided, but such joints have frequently required an endwise abutting relationship of the resilient portions to provide sealing, thereby to prevent leakage between the sections. Such endwise abutment may have no play therebetween, for otherwise the joint will leak. Other approaches have been to provide a sealing lip along the inner and outer edges of each section rather than along the center, thereby to provide an inner lip and an outer lip on each face of the gasket to seal independently each of the other. Such a construction is illustrated in U.S. Pat. No. 3,738,670.

Further, prior art sectional gasket assemblies have required the manufacture of at least two different size and shape pieces for assembly into a gasket of desired size and shape.

SUMMARY OF THE INVENTION

In accordance with the present invention, an improved interlocking sectional gasket assembly is provided. In one form, the gasket may be formed of a plurality of substantially identical elements, thereby minimizing the number and size of molds which may be necessary to produce a gasket, or the gasket may be formed of a plurality of elements, some of which are identical and others of which are not.

In a preferred form, a sectional gasket assembly of the present invention is formed from at least two elongated gasket sections, each of which sections has a first end providing a first connecting element of a given configuration and including a first button and a first opening, and each of which section has a second end providing a second connecting element of the same configuration and including a second button and a second opening, the first button and first opening of a first gasket section being juxtaposed and adapted to sealingly mate respectively with an opening and button of a second section to provide a sealed joint thereat.

Each section desirably comprises a molded elastomer, is generally flat, and may include a rigid core embedded within the molded elastomer. Each gasket section has a pair of opposite surfaces, and, in a preferred form, the first connecting element and second connecting element are formed in the same surface. The rigid core may extend into each connecting element to a location midway between the opening and button thereof.

In one embodiment, the button of one section is proportioned to enter an opening in a second section and to extend outwardly to one of the opposite surfaces of the second section. To provide an integrated, easily manipulated gasket assembly, each mating button/opening is preferably press-fit together.

Auxiliary sealing beading may be provided along the lengths of the gasket sections on the opposite surfaces, and auxiliary sealing beading may be provided on the opposite surfaces adjacent the peripheries of the openings and buttons, whereby under compression the auxiliary sealing beading promotes sealing mating between juxtaposed buttons and openings.

In one aspect of the present invention, the sectional gasket assembly is made of four gasket sections, the gasket assembly being differently symmetrical about each of an X-axis and a Y-axis, each of the sections having a first end providing a first connecting element of a given configuration and including a first button and a first opening and having a second end providing a second connecting element of the same configuration and including a second button and a second opening, the first button and first opening of a first gasket section being juxtaposed and adapted to sealingly mate respectively with a first opening and first button of a second section to provide a sealed joint thereat, and the second button and second opening of a first gasket section being juxtaposed and adapted to sealingly mate with a second opening and a second button, respectively, of a third section to provide a sealed joint thereat.

Further objects, features and advantages of the present invention will become apparent from the following description and drawings of a presently preferred embodiment.

DESCRIPTION OF THE PREFERRED EMBODIMENT

Figure 1:
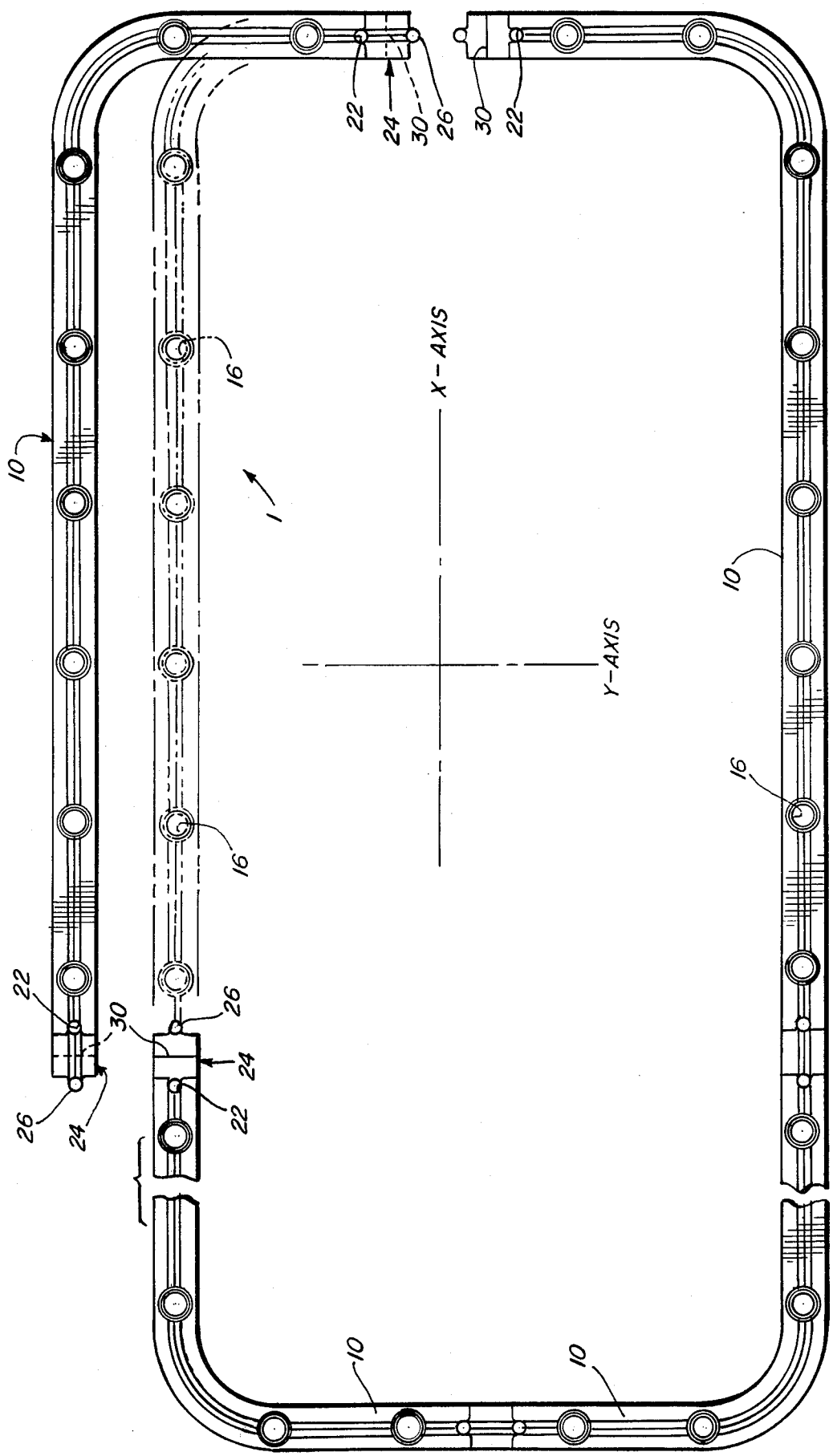
FIG. 1 is a top plan view of a gasket assembly in accordance with the present invention, showing a plurality of gasket sections juxtaposed, with some partially broken away.
Figure 3:
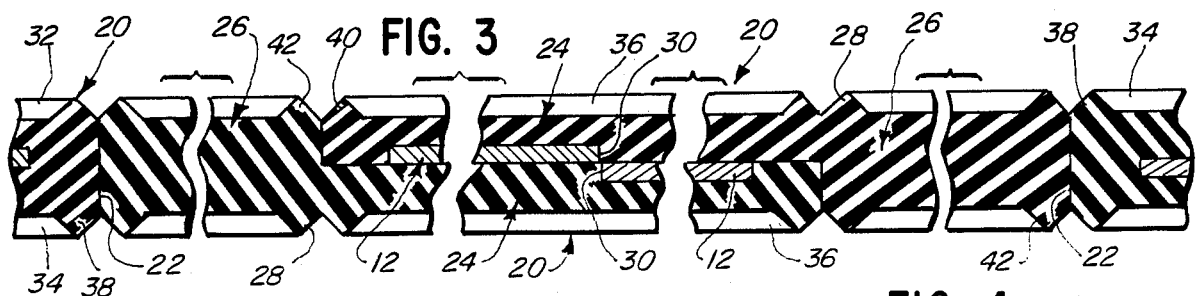
FIG. 3 is an enlarged fragmentary cross-sectional view as viewed substantially from cross-sectional line 3—3 of FIG. 2.
Figure 4:
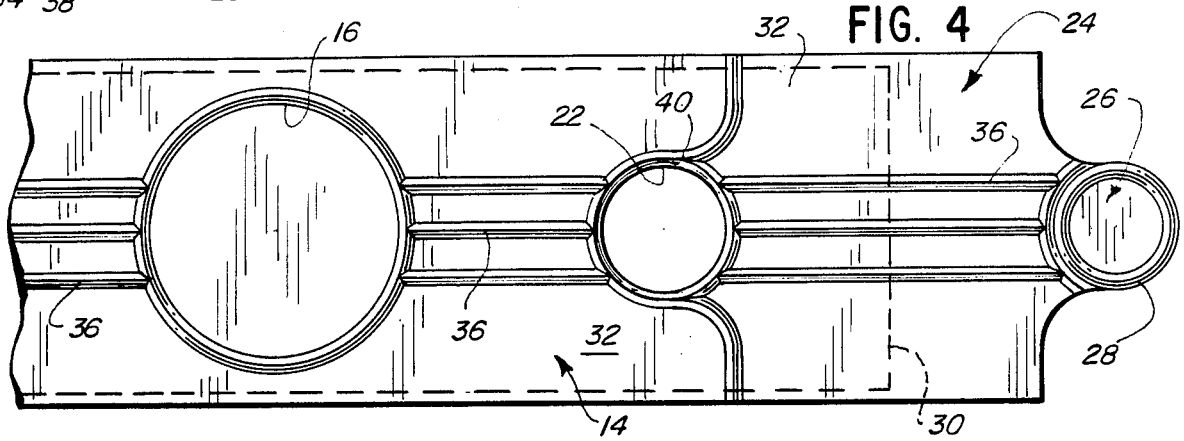
FIG. 4 is a top plan view of one end segment of a gasket section of FIG. 2.

Referring now to the drawings, FIG. 1 illustrates an interlocking sectional gasket assembly 1 which, in the form there shown, is formed of four identical elongated gasket sections 10, each of which may be made from a single mold. Gasket assembly 1, as seen, is annular in configuration. Gasket assembly 1 is adapted to serve as an oil pan gasket, although gasket assemblies of the present invention may be designed and used for a wider range of purposes. Each elongated section 10 is generally flat and L-shaped and is formed, as by molding, of an elastomer, and comprises a rigid plastic or metallic core, such as the rigid metal core 12, which is embedded or substantially encapsulated except at its outer surfaces at its very ends (as best seen in FIG. 3) in an elastomeric envelope 14. Core 12 is vertically displaced from the center by one-half its thickness so that only its outer surface will be exposed after molding. Envelope 14 defines a plurality of openings 16 adapted to allow bolts (not shown) to pass therethrough to facilitate clamping of the gasket assembly 1 between the pair of surfaces to be sealed by the gasket assembly 1. Upper surface 35 and lower surface 32 comprise the pair of opposite surfaces against which sealing is to take place.

Figure 5:
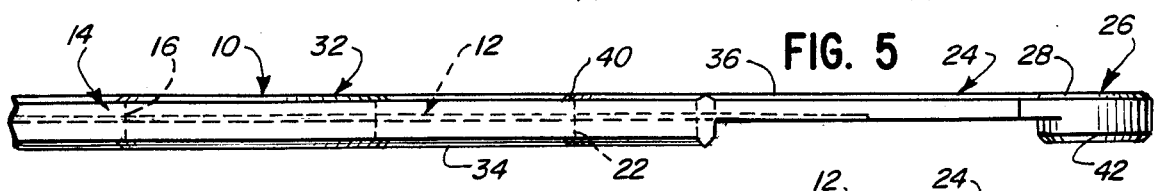
FIG. 5 is a side-elevational view of FIG. 4.
Figure 6:
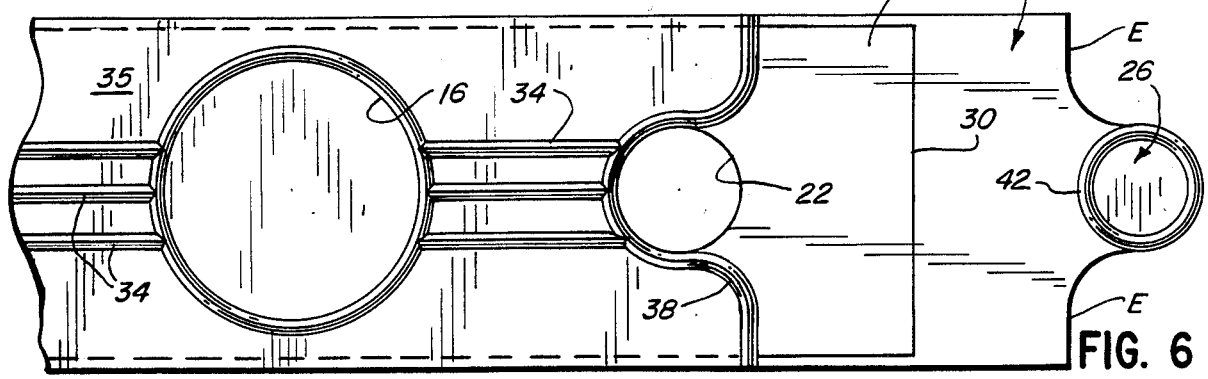
FIG. 6 is a bottom view of FIG. 4.

Each section 10 comprises a pair of complementary ends or segments 20. Each end segment 20 provides a connecting element of a given configuration, including a clear-through opening 22, a generally flat section 24 of reduced thickness, and a generally circular button 26. Each end segment 20 is of the same configuration and each is formed in the same upper surface 35 of the gasket section 10. Opening 22 and button 26 are preferably in line with each other and are disposed generally along the central longitudinal axis of the section 10 bearing end segment 20. As seen in FIGS. 3 to 6, the rigid core 12 extends to the connecting element and terminates at its end 30 at a location approximately midway between the button 26 and the opening 22 in the generally flat section 24. The terminal portion is best seen in FIGS. 5 and 6.

To enhance the sealing capacity of the section 10, generally V-shaped, longitudinally extending sealing beading, such as a plurality of beads 34, are provided on upper surface 35 of section 10 and longitudinally extending V-shaped sealing beading, such as a plurality of beads 36, are provided on the lower surface 32 of section 10. Beads 34 and 36 extend along the length of the gasket section 10 and preferably are interrupted substantially only at the openings 16 and 22 and at button 26. An upper bead 38 and a lower bead 40 are also provided about major peripheral portions of the opening 22. A lower circumferential bead 28 is provided around the bottom periphery of button 26 and a top bead 42 is provided around the top periphery of the button 26.

The other connecting element or end section 20 also comprises a generally flat section 24 of reduced thickness which defines a clear-through opening 22 and a generally circular button 26 which are also in line with each other and which are also located centrally of the longitudinal axis of section 10. The beads 34, 36 extend similarly to the zone of section 24.

In the embodiment shown, with the end segments 20 formed in the same surface of the section 10, i.e., both facing upwardly, it will be apparent that a pair of identical sections may simply have one section turned over with the first connecting elements superimposed and juxtaposed in complementary fashion to form a U-shaped configuration defined by the two sections 10. A like pair may be similarly superimposed into a U-shaped configuration and the U's then inverted and a gasket assembly formed by inverting one U and juxtaposing the same with a first pair (a first U) to form an enclosed rectangular gasket of annular shape. Ellipses and other configurations may be similarly formed of four identical gasket sections.

It would also be possible to form a gasket section with one connecting element or end segment formed in one section surface and the other connecting element or end segment formed in the other section surface. Connection of four of these would result in the production of a square if four identical L-shaped parts were assembled.

When a pair of sections 10 are juxtaposed with a pair of the connecting elements confronting each other, it will be apparent that a first button 26 will be positioned in one opening 22, and a second button 26 will be positioned in a second opening 22.

Figure 2:
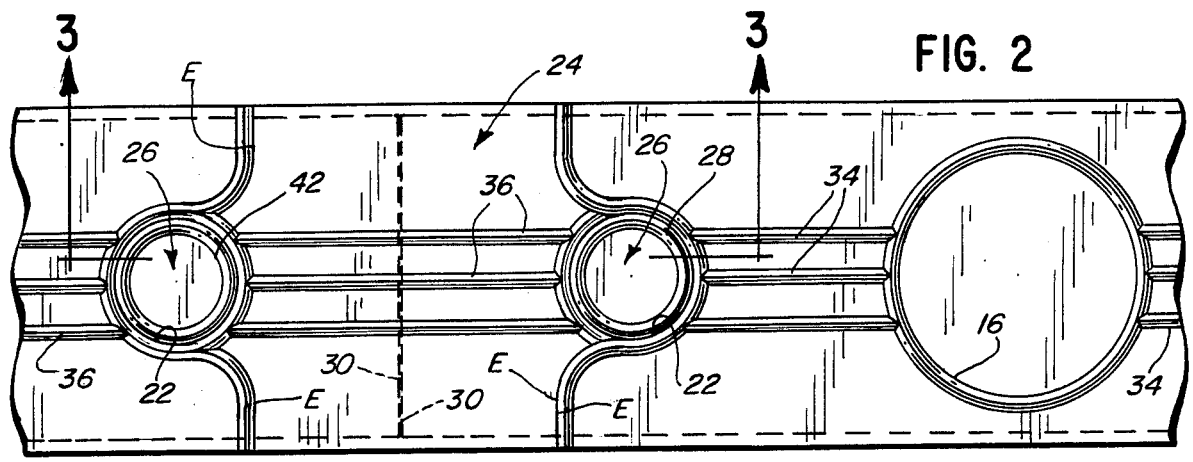
FIG. 2 is an enlarged portion of the gasket assembly of FIG. 1 showing a pair of gasket sections at a joint therebetween.

Preferably, button 26 is sized so that it snugly fits within an opening 22, so that the connecting section will sealingly mate to provide a sealed joint thereat. The snug fit may be a press-fit. The respective buttons and openings are of substantially the same size and shape so that if there were any tendency for a leakage path to form between the confronting edges or shoulders of the adjacent ends E (FIGS. 2 and 6) of the flat section 24, a seal against leakage will be provided by the walls of the buttons and openings within which they are snugly fitted.

To enhance the sealing effect of the respective buttons and openings, the button may be of a slightly greater thickness than the height of the associated opening. As such, under compression, the button will tend to expand outwardly into a tight sealing engagement with the wall of the associated opening.

It will also be apparent that the pairs of buttons/openings will tend to associate the parts in a fixed relationship, helping to make the gasket assembly 1 more easily manipulated without fear that it will separate as a result of handling, as might well be the case with gasket assemblies of the type illustrated in U.S. Pat. Nos. 3,231,289 and 4,293,135. When the sections are press-fit together, the buttons and openings help to provide an integrated, easily manipulated gasket assembly.

Thus, the combination of the overlap of the connecting elements, including the thinned sections 24 and the pairs of button and opening connectors, produce a more stable gasket assembly and one which seals quite effectively.

Additionally, it will be apparent that a single mold may be used to form a gasket element which may be used to produce a symmetrical gasket which is other than circular or square. This is because each gasket section 10 has a pair of end segments which is identical, one on the top of one end and the other on the top of the other end. Gaskets of the type shown in U.S. Pat. No. 3,231,289, which has a button at one end and a groove at the other end, cannot be used right side up or upside down, except to make a square, a circle, or a regular configuration which is identically symmetrical about both an X-axis and a Y-axis. In accordance with the present invention, a gasket which is differently symmetrical about an X-axis and a Y-axis may be formed (see FIG. 1), i.e., a non-square rectangle as illustrated, or a non-circular ellipse, etc. This is of great advantage where otherwise expensive plural molds must be made to utilize the teachings of patents, such as U.S. Pat. Nos. 3,231,289 and 4,293,135. This advantage results from the use of connecting elements on opposite ends of the same surface of the gasket sections 10. Although, as shown, the flat sections 24 are formed in the same surface of the gasket sections 10, it is also possible to form them in opposite surfaces as mentioned above.

The unbeaded surfaces of sections 24 are in confronting relationship, with the edges or ends 30 of the cores 12 closely aligned. When assembled and under compression, a seal against leakage is provided between the confronting surfaces of sections 24. The longitudinal V-shaped sealing beads 34 and 36 will be in appropriate alignment to provide a continuous sealing beading on each side of the adjacent sections 10, and across the joint formed by end segments 20.

It will also be apparent that under compression, the beads adjacent edges E will promote sealing along the confronting surfaces of the edges to enhance the seals thereat. The beads at the surfaces of the juxtaposed openings and buttons will similarly promote sealing along the confronting surfaces thereof when the beads are placed under compression.

Although the openings 22 have been shown as clear-through, it is also possible to provide openings which have a depth substantially equal to the thickness of the section 10 less the thickness of the associated flat section 24. In that case, the button thickness will be complementary, and the seals will be similarly affected.

From the foregoing, it will be apparent to those skilled in the art that further modifications may be made within the spirit and scope of the present invention. Accordingly, the scope of the invention is not to be considered as being limited, except insofar as may be required by the appended claims.

I claim:

1. A sectional gasket assembly made of at least two gasket sections, each said section having a first end providing a first connecting element of a given configuration and including a first button and a first opening, and having a second end providing a second connecting element of the same configuration and including a second button and a second opening, the first button and first opening of a first gasket section being juxtaposed and adapted to sealingly mate respectively with an opening and button of a second gasket section to provide a sealed joint thereat.

2. A sectional gasket assembly in accordance with claim 1 and wherein each said section comprises molded elastomer.

3. A sectional gasket assembly in accordance with claim 2 and wherein each said gasket section is generally flat and includes a rigid core embedded within said molded elastomer.

4. A sectional gasket assembly in accordance with claim 1 and wherein each said gasket section has a pair of opposite surfaces, and wherein said first connecting element is formed in one said surface and said second connecting element is formed in the same surface.

5. A sectional gasket assembly in accordance with claim 4 and wherein each said gasket section is generally flat and includes a rigid core embedded within said molded elastomer.

6. A sectional gasket assembly in accordance with claim 5 and wherein each said gasket section has a pair of opposite surfaces, and wherein said first connecting element is formed in one said surface and said second connecting element is formed in the same surface.

7. A sectional gasket assembly in accordance with claim 6 and wherein said rigid core extends into each said connecting element to a location midway between the opening and button thereat.

8. A sectional gasket assembly in accordance with claim 2 and wherein said mating buttons and openings are press-fit together to provide an integrated, easily manipulated gasket assembly.

9. A sectional gasket assembly in accordance with claim 2 and wherein each said gasket section is generally flat and has a pair of opposite surfaces, and wherein each said opening is a clear-through opening and each said button is proportioned to enter a said opening and to extend outwardly to one of said opposite surfaces.

10. A sectional gasket assembly in accordance with claim 9 and wherein said mating buttons and openings are press-fit together to provide an integrated, easily manipulated gasket assembly.

11. A sectional gasket assembly in accordance with claim 4 and wherein sealing beading is provided along the lengths of the gasket sections on said opposite surfaces.

12. A sectional gasket assembly in accordance with claim 4 and wherein sealing beading is provided on said opposite surfaces adjacent the peripheries of said openings and buttons, whereby under compression said sealing beading promotes sealing mating between juxtaposed buttons and openings.

13. A sectional gasket assembly made of four gasket sections, said gasket assembly being differently symmetrical about each of an X-axis and a Y-axis, each said section having a first end providing a first connecting element of a given configuration and including a first button and a first opening and having a second end providing a second connecting element of the same configuration and including a second button and a second opening, the first button and first opening of a first gasket section being juxtaposed and adapted to sealingly mate respectively with an opening and button of a connecting element of a second gasket section to provide a sealed joint thereat, and the second button and second opening of a first gasket section being juxtaposed and adapted to sealingly mate with an opening and a button of a connecting section of a third gasket section to provide a sealed joint thereat.

14. A sectional gasket assembly in accordance with claim 13 and wherein each said gasket section comprises molded elastomer, is generally flat, and includes a rigid core embedded within said molded elastomer.

15. A sectional gasket assembly in accordance with claim 14 and wherein each said gasket section has a pair of opposite surfaces, and wherein said first connecting element is formed in one said surface and said second connecting element is formed in the same surface.

16. A sectional gasket assembly in accordance with claim 14 and wherein each said gasket section has a pair of opposite surfaces, and wherein each said opening is a clear-through opening and each said button is proportioned to enter a said opening and to extend outwardly to one of said opposite surfaces.

17. A sectional gasket assembly in accordance with claim 16 and wherein said mating buttons and openings are press-fit together to provide an integrated, easily manipulated gasket assembly.

18. A sectional gasket assembly in accordance with claim 17 and wherein auxiliary sealing beading is provided along the lengths of the gasket sections on said opposite surfaces.

19. A sectional gasket assembly in accordance with claim 17 and wherein auxiliary sealing beading is provided on said opposite surfaces adjacent the peripheries of said openings and buttons, whereby under compression said auxiliary sealing beads promote sealing mating between juxtaposed buttons and openings.

20. A sectional gasket assembly in accordance with claim 15, and wherein said connecting element of a second gasket section comprises a first button and first opening and said connecting element of a third gasket section comprises a second button and second opening.

21. A method of making a sectional gasket assembly made of plural gasket sections comprising the steps of providing at least two gasket sections, each said section having a first end providing a first connecting element of a given configuration and including a first button and a first opening, and having a second end providing a second connecting element of the same configuration and including a second button and a second opening, juxtaposing and sealingly mating the first button and first opening of a first gasket section respectively with an opening and button of a second gasket section, thereby to form a gasket assembly and to form a sealed joint thereat.

22. A method in accordance with claim 21 and wherein each said gasket section has a pair of opposite surfaces, and wherein said first connecting element is formed in one said surface and said second connecting element is formed in the same surface.

23. A method in accordance with claim 21 and wherein each said gasket section is generally flat and includes a rigid core embedded within molded elastomer.

24. A method in accordance with claim 23 and wherein each said gasket section has a pair of opposite surfaces, and wherein said first connecting element is formed in one said surface and said second connecting element is formed in the same surface.

25. A method in accordance with claim 24 and wherein said mating buttons and openings are sized so that when they are juxtaposed and mated they are press-fit together to provide an integrated, easily manipulated gasket assembly.

26. A method of making a sectional gasket assembly in accordance with claim 21 and wherein said gasket assembly comprises at least four gasket sections and is differently symmetrical about each of an X-axis and a Y-axis, each said section having a first end providing a first connecting element of a given configuration and including a first button and a first opening and having a second end providing a second connecting element of the same configuration and including a second button and a second opening, the first button and first opening of a first gasket section being juxtaposed and adapted to sealingly mate respectively with an opening and button of a connecting element of a second gasket section to provide a sealed joint thereat, and juxtaposing and sealingly mating the second button and second opening of a first gasket section with an opening and a button of a connecting section of a third gasket section, thereby to provide a sealed joint thereat.

27. A method of making a sectional gasket assembly in accordance with claim 26 and wherein each said gasket section comprises molded elastomer, is generally flat, and includes a rigid core embedded within said molded elastomer.

28. A method of making a sectional gasket assembly in accordance with claim 27 and wherein each said gasket section has a pair of opposite surfaces, and wherein said first connecting element is formed in one said surface and said second connecting element is formed in the same surface.

29. A method of making a sectional gasket assembly in accordance with claim 28 and wherein the steps of juxtaposing and mating buttons and openings comprises the step of press-fitting them together to provide an integrated, easily manipulated gasket assembly.

30. A method of making a sectional gasket assembly in accordance with claim 29, and wherein said connecting element of a second gasket section comprises a first button and first opening and said connecting element of a third gasket section comprises a second button and second opening.

* * * * *